(12) United States Patent
Benz et al.

(10) Patent No.: US 6,885,875 B1
(45) Date of Patent: Apr. 26, 2005

(54) METHOD AND RADIO COMMUNICATION SYSTEM FOR REGULATING POWER BETWEEN A BASE STATION AND A SUBSCRIBER STATION

(75) Inventors: Michael Benz, Berlin (DE); Michael Faerber, Wolfratshausen (DE); Franz Goldhofer, Waakirchen (DE); Anja Klein, Berlin (DE); Reinhard Koehn, Berlin (DE); Meik Kottkamp, Berlin (DE); Joern Krause, Berlin (DE); Holger Landenberger, Bocholt (DE); Sebastian Obermanns, Bocholt (DE); Stefan Oestreich, Holzkirchen (DE); Armin Sitte, Berlin (DE); Volker Sommer, Berlin (DE); Jean-Michel Traynard, Munich (DE); Thomas Ulrich, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/806,646
(22) PCT Filed: Oct. 8, 1999
(86) PCT No.: PCT/DE99/03249
§ 371 (c)(1),
(2), (4) Date: Jun. 22, 2001
(87) PCT Pub. No.: WO00/22757
PCT Pub. Date: Apr. 20, 2000

(30) Foreign Application Priority Data

Oct. 9, 1998 (DE) ......................................... 198 46 675

(51) Int. Cl.7 ................................................. H04Q 7/20
(52) U.S. Cl. .................... 455/522; 455/524; 455/562.1; 370/318; 370/334
(58) Field of Search ............................... 455/522, 441, 455/442, 443, 444, 562.1, 101, 524, 69, 67.11; 370/318, 320, 332, 335, 334

(56) References Cited

U.S. PATENT DOCUMENTS

| | | | | |
|---|---|---|---|---|
| 5,485,486 A | * | 1/1996 | Gilhousen et al. | 370/335 |
| 5,487,174 A | * | 1/1996 | Persson | 455/444 |
| 5,771,451 A | | 6/1998 | Takai et al. | |
| 5,943,610 A | | 8/1999 | Endo | |
| 6,035,209 A | * | 3/2000 | Tiedemann et al. | 455/522 |
| 6,128,476 A | * | 10/2000 | Fujita | 455/101 |
| 6,337,987 B1 | * | 1/2002 | Agin et al. | 455/522 |
| 6,337,988 B1 | * | 1/2002 | Agin et al. | 455/522 |
| 6,351,651 B1 | * | 2/2002 | Hamabe et al. | 455/522 |
| 6,549,785 B1 | * | 4/2003 | Agin | 455/522 |

FOREIGN PATENT DOCUMENTS

| | | |
|---|---|---|
| EP | 0 682 417 | 11/1995 |
| JP | 9-275373 | 10/1997 |
| WO | WO96/31014 | 10/1996 |
| WO | WO96/38944 | 12/1996 |
| WO | WO98/11677 | 3/1998 |
| WO | WO98/36508 | 8/1998 |

* cited by examiner

Primary Examiner—Edward F. Urban
Assistant Examiner—Blane J. Jackson
(74) Attorney, Agent, or Firm—Fish & Richardson P.C.

(57) ABSTRACT

According to the invention, transmissions of the second radio station are received in the first radio station in which the operating instruction for transmission power of the second radio station is determined. The operating instruction is transmitted during a following transmission of the first radio station to the second radio station, whereupon the latter takes into account the operating instruction for power regulation during one of its following transmissions. Contrary to prior art, no time invariable or fixed step size is used. An operating instruction is used instead which is related to a variable step size in transmission power regulation. The variable step size is subscriber-dependent and time-dependent regulated by the radio stations.

28 Claims, 6 Drawing Sheets

(prior art)

Fig. 2a
Method 3

| Normal mode | e.g. ΔTPC=0.5 dB |
|---|---|
| slotted mode with 5 ms interruption | e.g. ΔTPC=1.5 dB for three time slots, then 0.5 dB again |
| slotted mode with 10 ms interruption | e.g. ΔTPC=2.0 dB for three time slots, then 0.5 dB again |

Fig. 2b
Method 2

| Normal mode | e.g. ΔTPC=0.5 dB |
|---|---|
| slotted mode with 5 ms interruption | ΔTPC announced in the signaling of the slotted mode for the agreed time, then 0.5 dB again |
| slotted mode with 10 ms interruption | ΔTPC announced in the signaling of the slotted mode for the agreed time, then 0.5 dB again |

Fig. 2c
Method 1

| Normal mode | e.g. ΔTPC=0.5 dB with normal TPC coding |
|---|---|
| slotted mode with 5 ms interruption | Use expanded TPC coding for e.g. three time slots or the remainder of the frame after the interruption |
| slotted mode with 10 ms interruption | Use expanded TPC coding for e.g. three time slots or the remainder of the frame after the interruption |

Fig. 3

| Time slot in DL | Time slot in UL | ΔTPC |
|---|---|---|
| 15 | 1 | 2 dB |
| .. | .. | .. |
| 8 | 8 | 0,5 dB |
| .. | .. | .. |
| 2 | 14 | 2 dB |

Fig. 4

| estimated speed of MS | signaled ΔTPC |
|---|---|
| 0 - 20 km/h | 0,5 dB |
| 20 - 80 km/h | 1 dB |
| > 80 km/h | 0,5 dB |

Fig. 5

| RX antenna diversity | Change in ΔTPC in MS (signaled) | Change in ΔTPC in BS |
|---|---|---|
| BS | -0,25 dB | 0 |
| MS | 0 | -0,25 dB |
| BS and MS | -0,25 dB | -0,25 dB |

Fig. 6a  Method 3

|  | ΔTPC in BS | ΔTPC in BS | ΔTPC in MS | ΔTPC in MS |
|---|---|---|---|---|
|  | + TPC | - TPC | + TPC | - TPC |
| Normal mode | 0,5 dB | 0,5 dB | 0,5 dB | 0,5 dB |
| Expansion of "active set" | 0,5 dB | 2.0 dB for two time slots, then 0.5 d.B | 0,5 dB | 1.0 dB for two time slots, then 0.5 dB |
| Reduction of "active set" | 2.0 dB for two time slots, then 0.5 d.B | 0,5 dB | 1.0 dB for two time slots, then 0.5 dB | 0,5 dB |

Fig. 6b  Method 1

|  | ΔTPC in BS | ΔTPC in BS | ΔTPC in MS | ΔTPC in MS |
|---|---|---|---|---|
|  | + TPC | - TPC | + TPC | - TPC |
| Normal mode | e.g. 0,5 dB | e.g. 0,5 dB | e.g. 0,5 dB | e.g. 0,5 dB |
| Expansion of "active set" | e.g. 0,5 dB | e.g. 2.0 dB for two time slots, then 0.5 d.B | e.g. 0,5 dB | is signaled |
| Reduction of "active set" | e.g. 2.0 dB for two time slots, then 0.5 d.B | e.g. 0,5 dB | is signaled | e.g. 0,5 dB |

Fig. 6c

Method 2

|  | ΔTPC in BS | ΔTPC in BS | ΔTPC in MS | ΔTPC in MS |
|---|---|---|---|---|
|  | +TPC | -TPC | +TPC | -TPC |
| Normal mode | e.g. 0,5 dB | e.g. 0,5 dB | e.g. 0,5 dB | e.g. 0,5 dB |
| Expansion and reduction of "active set" | use expanded TPC coding for e.g. 2 time slots or remainder of the frame after the interruption | (see ΔTPC and +TPC in BS) | (see ΔTPC and +TPC in BS) | (see ΔTPC and +TPC in BS) |

METHOD AND RADIO COMMUNICATION SYSTEM FOR REGULATING POWER BETWEEN A BASE STATION AND A SUBSCRIBER STATION

FIELD OF INVENTION

The invention relates to a method and radio communication system for controlling power between a base station and a subscriber station, especially for CDMA transmission methods in broadband transmission channels.

BACKGROUND

In radio communication systems, information (for example voice, picture information or other data) is transmitted with the aid of electromagnetic waves via a radio interface. The radio interface relates to a connection between a base station and subscriber stations, where the subscriber stations can be mobile stations or stationary radio stations. The electromagnetic waves are radiated at carrier frequencies which are in the frequency band provided for the respective system. For future radio communication systems, for example the UMTS (Universal Mobile Telecommunication System) or other third-generation systems, frequencies are provided in the frequency band of approx. 2000 MHz.

For the third generation of mobile radio, broadband radio interfaces (B=5 MHz) are provided which use a CDMA (code division multiple access) transmission method for differentiating between different transmission channels. The CDMA transmission method requires a continuous transmission power control which, as a rule, functions for both directions of transmission in the form of a closed control loop. For the up-link (the radio transmission from the mobile station to the base station), the base station evaluates transmissions of the mobile station with respect to the transmission quality and transmits back to the subscriber station a transmission power correction instruction which is used by the subscriber station for controlling transmission power for subsequent transmissions. From ETSI STC SMG2 UMTS-L1, Tdoc SMG2 UMTS-L1 221/98 of 25.8.1998, pages 29–30, it is known to specify a fixed increment for increasing or reducing the transmission power, which can only vary from radio cell to radio cell. Thus, the increment of transmission power correction is a static parameter. Specifying the increment statically, however, ignores certain dynamic characteristics of the transmission performance via the radio interface which, from time to time, causes an unnecessarily high interference in the radio communication system if the transmission power is too high or a transmission quality which is too poor if the transmission power is too low. It is an object of the invention to improve the transmission performance. This object is achieved in accordance with the method having the features of claim 1 and the radio communication system having the features of claim 16. Advantageous further developments can be found in the subclaims.

SUMMARY

According to the invention, the transmissions of a second radio station are received in a first radio station and a transmission power correction instruction for the transmission power of the second radio station is determined. The transmission power correction instruction is transmitted during a subsequent transmission of the first radio station to the second radio station whereupon the latter takes the transmission power correction instruction into consideration for adjusting the transmission power during one of its subsequent transmissions. In contrast to the prior art in broadband CDMA transmission methods, it is not a time-invariant and fixed increment which is used in changing the transmitting power but a transmission power correction instruction which is related to a variable increment of the transmission power adjustment. The variable increment is set by the radio stations in a subscriber-dependent and time-dependent manner.

The larger the increment, the faster wrong transmission power adjustments will be corrected, but at the cost of more inaccurate control. If the increment is small, the control is more accurate but the delay is greater until large deviations are corrected. Due to the variable increment, the control can be adapted to all transmission conditions in a subscriber-dependent and time-dependent manner and the control can thus be improved. Improved control produces reduced interference and a transmission quality which is guaranteed for all connections.

According to an advantageous further development of the invention, a transmission condition for the connection is evaluated repetitively in time in the radio stations and the increment is increased or reduced with changes in the transmission condition. The transmission condition is one or a combination of the following parameters which cause a change in the control loop for the transmission power adjustment:

- an interruption in a continuous transmission mode for measuring purposes (slotted mode),
- a change in the asymmetry of utilization of radio resources of the radio interface in TDD mode between up-link and down-link,
- the speed of movement of the subscriber station,
- the number of transmitting and/or receiving antennas used,
- a length of time averaging of the signal evaluation at the receiver end,
- a length of the channel impulse response used during the signal detection,
- number of base stations which are in radio contact with the subscriber station in a macro-diversity transmission method.

By changing these transmission conditions, the control loop is interrupted for a certain time or, respectively, the time of interruption is changed or the quality of detection of the transmitted information is abruptly changed. These conditions can be met better by means of the variable increment.

The control method is particularly suitable for radio interfaces which use a CDMA subscriber separation method in broadband transmission channels and in which a multiplicity of transmission conditions is possible which change the control loop. Typical applications are the FDD (frequency division duplex) and TDD (time division duplex) mode in third-generation mobile radio systems. The control applies to up-link and down-link so that the first radio station is either the base station or the subscriber station.

The increment to be used is obtained from signaling, implicitly coded within the transmission power correction instruction transmitted or according to a correspondence table or calculation rule linking the different transmission conditions with the increments to be used. Combinations of these measures can also be used. The exemplary embodiments show which specifications are advantageous for which changes in transmission condition.

DESCRIPTION OF THE DRAWINGS

Exemplary embodiments of the invention will be explained in greater detail with reference to the attached drawings, in which:

FIG. 2 shows a determination of the increment in "slotted mode",

FIG. 3 shows a determination of the increment in the case of different conditions of asymmetry, FIG. 4 shows a determination of the increment in the case of different speeds of the mobile station, FIG. 5 shows a determination of the increment in the case of the use of a reception diversity method, FIG. 6 shows a determination of the increment in the case of "soft handover" of a mobile station.

DETAILED DESCRIPTION

Figure 1:
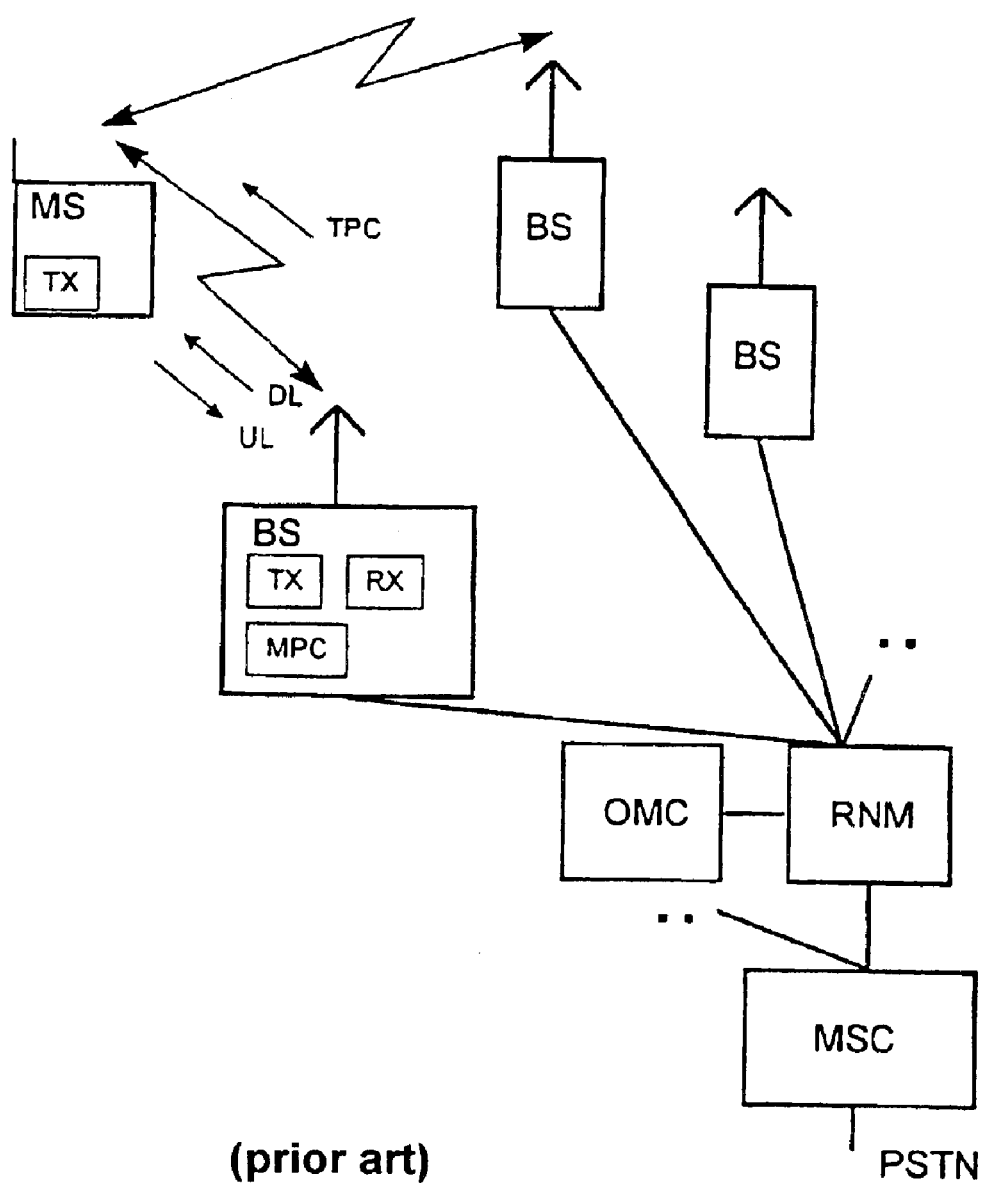
FIG. 1 shows a diagrammatic representation of a radio communication system.

The mobile radio system shown in FIG. 1 as an example of a radio communication system consists of a multiplicity of mobile switching centers MSC which are networked together and, respectively, establish access to a landline network PSTN. These mobile switching centers MSC are also connected to in each case at least one facility RNM for allocating radio resources. Each of these facilities RNM, in turn, provides for a connection to at least one base station BS.

Such a base station BS can set up a connection to subscriber stations, e.g. mobile stations MS or other mobile and stationary terminals via a radio interface. Each base station BS forms at least one radio cell. FIG. 1 shows a connection V transmitting user information between a base station BS and a mobile station MS. A system for transmission power control of the radio link via this radio interface will be explained later, only the transmission power adjustment of the mobile station MS being shown. Equivalent measures can be used for the reverse direction of transmission.

An operation and maintenance center OMC effects control and maintenance functions for the mobile radio system or parts thereof. The functionality of this structure can be transferred to other radio communication systems in which the invention can be used, especially for subscriber access networks with wireless subscriber access.

The transmission power control is shown for radio transmission in the up-link UL. Transmission means TX of the mobile station MS send information in the up-link UL, a transmission power correction instruction TPC being taken into consideration for adjusting the transmission power. This transmission power correction instruction TPC is produced by receiving means RX in the base station BS receiving the transmissions of the mobile station MS and control means MPC determining the transmission power correction instruction TPC which is then transmitted to the mobile station MS in the down-link DL.

The transmission power of the mobile station MS is not changed arbitrarily but in increments. If the mobile station MS has been previously transmitting with a transmission power Px, the transmission power control either increases or reduces this transmission power for the subsequent transmission. If a transmission error occurs, the transmission power is maintained. Signaling the transmission power correction instruction TPC from the base station BS to the mobile station MS provides information on which of the three cases applies. However, the increase or decrease is only done with an increment ΔTPC which is not arbitrary but is predetermined. According to the invention, this increment ΔTPC is subscriber-dependent and time-dependent.

Three methods can be used for establishing the increment ΔTPC which, together with the transmission power correction instruction TPC and the previous transmission power, provides an unambiguous rule for adjusting the transmission power:

Method 1:

The increment ΔTPC to be used is also signaled. As long as no change in the increment ΔTPC is announced, the current increment ΔTPC is retained. The speed with which an increment ΔTPC can be newly set thus depends on the signaling capabilities.

Method 2:

The increment ΔTPC currently to be used is implicitly contained in the transmission power correction instruction TPC by means of appropriate coding. As shown in ETSI STC SMG2 UMTS-L1, Tdoc SMG2 UMTS-L1 221/98 of 25.8.1998, pages 29–30, the transmission power correction instruction, which only needs one bit (power+(increased)or power–(reduced)) is coded with two bits according to the prior art. The additional signaling of the increment ΔTPC can be done either by using more than two bits for signaling or by reducing the redundancy in the signaling.

Method 3:

The increment ΔTPC to be used is firmly tied to certain events or transmission modes which are called transmission conditions in the text which follows. The link between transmission condition and increment ΔTPC is stored in an allocation table which is binding to both radio stations MS, BS.

In the text which follows, the determination of the increment ΔTPC is explained for some transmission conditions which previously produced an unsatisfactory control characteristic for the transmission power.

"slotted mode"

The so-called "slotted mode" in the FDD (frequency division duplex) mode, see also ETSI STC SMG2 UMTS-L1, Tdoc SMG2 UMTS-L1 221/98 of 25.8.1998, pages 33–34, describes an interruption of an otherwise continuous transmission for measuring purposes to prepare, for example, a hand over of the mobile station MS to another base station BS. The interruption can occur in the up-link or the down-link. During the period of the interruption, the control loop is not effective so that on resumption of transmission, the transmission power previously set often deviates greatly from the optimum. To provide fast correction of the transmission power, the increment ΔTPC is temporarily increased after the interruption. Advantageously, the longer the interruption lasts the greater the increase.

According to FIG. 2a, an increment ΔTPC of 0.5 dB normally applies which is increased to 1.5 dB with an interruption of 5 ms for three time slots or to 2.0 dB with an interruption of 10 ms before ΔTPC=0.5 dB again applies. This is predetermined according to Method 1 and thus known both to the mobile station MS and the base station BS.

As an alternative, the increment ΔTPC to be used subsequently can also be signaled in the signaling announcing the "slotted mode" according to FIG. 2b. The increment can be set in dependence on the duration of the interruption. Either the duration of validity of the altered increment ΔTPC is predetermined, e.g. time slots, or contained in the signaling. A further possibility is shown in FIG. 2c where an expanded TPC coding, i.e. the implicit transmission of the increment ΔTPC together with the transmission power correction instruction TPC is used for providing for larger steps in the transmission power correction for a period of three time slots or the rest of a frame.

Asymmetry with TDD

The TDD (time division duplex) mode of the radio communication system can assign time slots of a frame in a frequency band optionally to the up-link or to the down-link. Thus, the transmission capacity can be distributed to the up-link or the down-link in accordance with demand so that asymmetric services are also supported well with optimum resource utilization. However, the asymmetry of the traffic also influences the control loop for the transmission power. In contrast to the FDD mode, there is not the possibility of planning predictable delays in the signaling of the transmission power correction instruction TPC due to the common frequency band for up-link and down-link. The greater the asymmetry, the less the capability of the control loop to follow fast changes in the transmission conditions.

In consequence, the increment $\Delta$TPC is determined in dependence on the asymmetry. With great asymmetry, a greater increment $\Delta$TPC than with less asymmetry is established for accelerating the transmission power control according to FIG. 3. With little asymmetry, the increment $\Delta$TPC is smaller for improving the accuracy of control. According to FIG. 3, method 3 is to be preferred. However, signaling according to method 1 is also possible since the asymmetry can only be changed in relatively great time intervals and there is relevant signaling in every case.

Speed of the mobile station

The so-called "fast fading" describes changes in the transmission conditions of the radio interface and its speed increases with increasing speed of the mobile station MS. Since even a fast transmission power control operates with a temporarily fixed increment $\Delta$TPC, the effectiveness of a large increment $\Delta$TPC decreases again with increasing speed of the mobile station MS. This is why, according to FIG. 4, a small increment $\Delta$TPC of e.g. 0.5 dB is established both with low speeds and with high speeds and a larger increment $\Delta$TPC of e.g. 1 dB is preferred at medium speeds. At low speeds, the accuracy of the transmission power control is good, and at medium speed the fast tracking of the transmission power for compensating for the fading is predominant. To establish the increment $\Delta$TPC, method 1, i.e. the signaling of the increment $\Delta$TPC by the base station BS to the mobile station MS is preferably used since the speed of the mobile station MS is estimated in the base station BS.

Diversity gain/fading variance

The dips in the received power produced by fast fading are limited by each diversity gain. Each diversity gain thus reduces the variance in the transmission power. The more diversity gains there are, the more the increment $\Delta$TPC can be reduced. The diversity gain increases with an increase in the number of echoes used in the channel impulse response, an increase in the number of independent transmitting and receiving antennas, an increase in the length of time averaging by means of spreading or interleaving.

In comparison with the transmission of the transmission power correction instruction TPC, these measures are taken more rarely so that method 1 (signaling) is to be preferred. FIG. 5 specifies an example for utilizing a different number of receiving antennas. If more than one receiving antenna is used, there is receiving antenna diversity. If the receiving end uses more than one antenna, a smaller increment $\Delta$TPC can be used at the transmitting end. The increment $\Delta$TPC is reduced by e.g. 0.25 dB per signaling.

"soft handover"

The so-called soft handover describes a transmission condition in which a mobile station MS is not only in radio contact with one base station BS but, at least temporarily, with at least one further base station BS. During the soft handover, the information of the mobile station MS is received by more than one base station BS and, respectively, the information is transmitted by more than one base station BS, both in the up-link and in the down-link. The base stations BS responsible for a mobile station MS are entered in an active set. Thus, every time when a base station BS has been accepted in the active set or has been removed from it, there is an abrupt change in the macro diversity gain in the up-link and the down-link and in the total transmission power in the down-link. The transmission power adjustment should be able to follow this as quickly as possible.

If the active set is expanded, the transmission power should be reduced as quickly as possible so that the system is not unnecessarily loaded with interference. If the active set is reduced, the transmission powers should be raised quickly in order to ensure adequate signal quality. In both cases, the increment $\Delta$TPC is temporarily increased. In is then advantageous to increase the increment $\Delta$TPC only in the direction of a reduction of the transmission power (−TPC) in the case of an expansion of the active set and to increase the increment $\Delta$TPC only in the direction of an increase in the transmission power (+TPC) in the case of a reduction of the active set. The change in the increment $\Delta$TPC can be greater in the down-link since in this case the total transmission power is also changed in addition to the diversity gain.

According to FIGS. 6a, 6b, 6c, all three methods can be used, the increase in the increment $\Delta$TPC only being applied for a limited period, e.g. two time slots or the remainder of the frame. After that, the most accurate possible transmission power setting with small increment $\Delta$TPC should again be used.

Since the expansion or reduction of the active set is signaled by the base station BS, the increment $\Delta$TPC can thus be established for the mobile station MS in accordance with a correspondence table, see FIG. 6a. As an alternative, the change can be signaled in accordance with FIG. 6b or the transmission power adjustment can be improved by changing the coding of the transmission power correction instruction TPC according to FIG. 6c.

Figure 7:
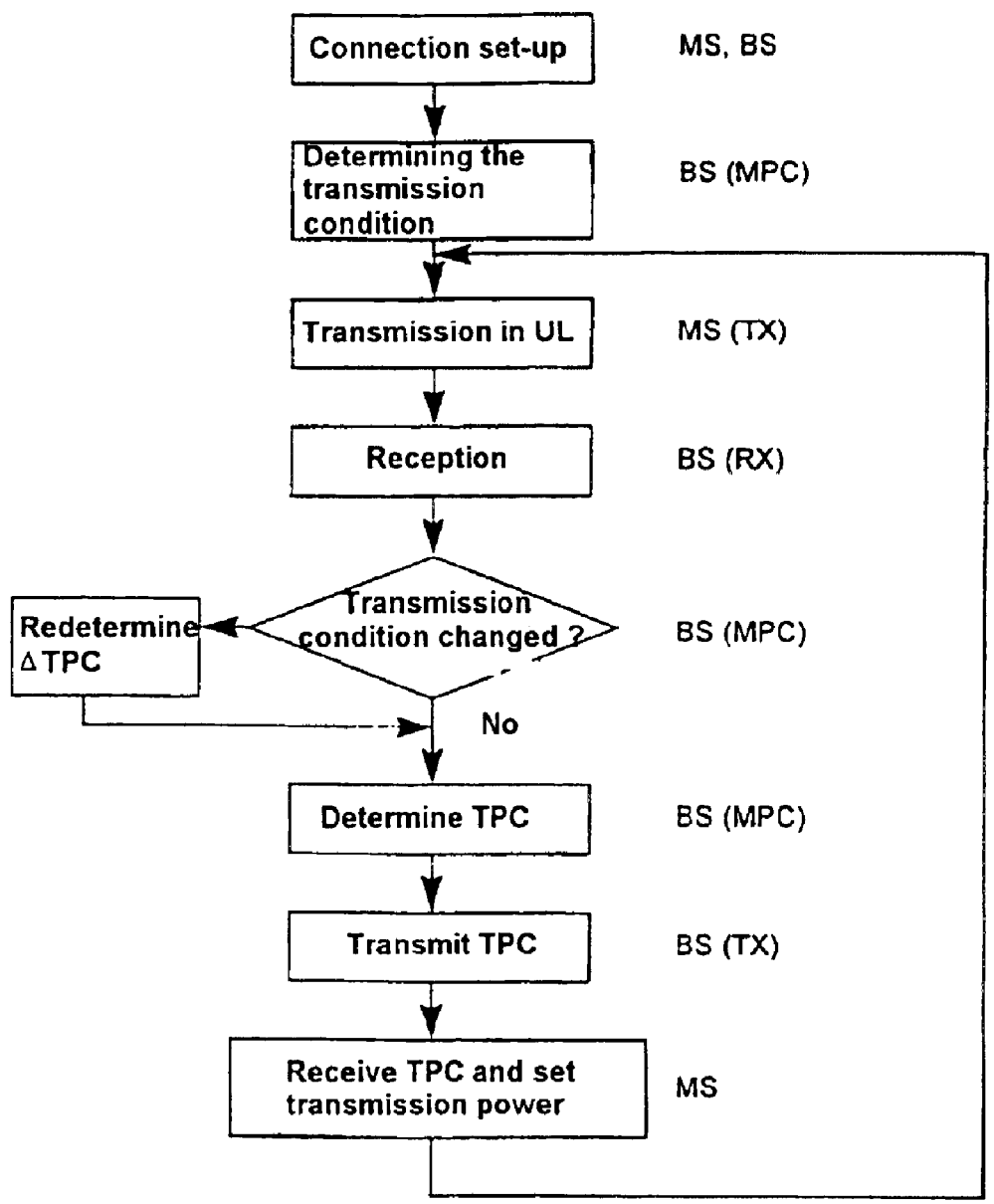
FIG. 7 shows a control loop for adjusting the transmission power.

According to FIG. 7, the transmission power control for a transmission in the up-link can be described in a simplified way as follows:

After a connection has been set up, the transmission condition is determined by the control means MPC of the base station BS. Transmission in the up-link UL takes place by means of the transmission means TX of the mobile station MS. These transmissions are received by receiving means RX of the base station BS. Furthermore, the control means MPC interrogate whether the transmission condition has changed in the meantime. If so, the increment $\Delta$TPC is newly determined and, if not, the increment $\Delta$TPC set at the beginning of the connection is retained. Furthermore, the control means MPC determine the transmission power correction instruction TPC so that the transmission power correction instruction can be transmitted to the mobile station MS in the down link DL by transmission means TX of the base station BS.

The mobile station MS receives the transmission power correction instruction TPC and adjusts the transmission power appropriately for subsequent transmissions, taking into consideration the increment $\Delta$TPC at the same time. The increment $\Delta$TPC was either contained in the transmission power correction instruction TPC according to method 2, was signaled according to method 1, or could be reconstructed from the present transmission condition by the mobile station MS in accordance with method 3.

What is claimed is:

1. A method of controlling power in a radio communication system having a radio interface between a first radio station and a second radio station, comprising:

receiving a transmission from the second radio station at the first radio station;

determining a transmission power correction instruction that corresponds to a transmission power of the second radio station, the transmission power correction instruction corresponding to a variable power adjustment increment, the variable power adjustment increment being adjustable in a subscriber-dependent manner and a time-dependent manner;

transmitting the transmission power correction instruction to the second radio station during a transmission of the first radio station; and adjusting the transmission power of the second radio station according to the transmission power correction instruction;

wherein the variable power adjustment increment is temporarily increased after an end of an interruption of transmission between the first radio station and the second radio station.

2. The method of claim 1, wherein an amount of increase of the variable power adjustment increment is based on a length of the interruption.

3. A method of controlling power in a radio communication system having a radio interface between a first radio station and a second radio station, comprising:

receiving transmissions of the second radio station at the first radio station;

determining a transmission power correction instruction that corresponds to a transmission power of the second radio station, the transmission power correction instruction corresponding to a variable power adjustment increment;

evaluating, over time, a condition of transmission between the first radio station and the second radio station, the condition of transmission comprising a speed of movement of the first radio station or the second radio station;

transmitting the transmission power correction instruction to the second radio station during a transmission of the first radio station; and adjusting the transmission power of the second radio station according to the transmission power correction instruction;

wherein the variable power adjustment increment is greater in a medium range of speed than in a high range of speed.

4. The method of claim 3, wherein the variable power adjustment increment is greater in a medium range of speed than in a low range of speed.

5. A method of controlling power in a radio communication system having a radio interface between a first radio station and a second radio station, comprising:

receiving transmissions of the second radio station at the first radio station;

determining a transmission power correction instruction that corresponds to a transmission power of the second radio station, the transmission power correction instruction corresponding to a variable power adjustment increment;

evaluating, over time, a condition of transmission between the first radio station and the second radio station, the condition of transmission comprising one or more of a number of transmitting antennas and a number of receiving antennas used to establish communication between the first radio station and the second radio station;

transmitting the transmission power correction instruction to the second radio station during a transmission of the first radio station; and adjusting the transmission power of the second radio station according to the transmission power correction instruction;

wherein the variable power adjustment increment varies in accordance with at least one of the number of transmitting antennas and the number of receiving antennas.

6. The method of claim 5, wherein, in a case that transmitting is performed in accordance with a macro diversity method, the number of antennas used to establish the connection is changed by changing a number of base stations that are in contact with at least one of the first radio station and the second radio station.

7. The method of claim 6, wherein the variable power adjustment increment is increased in a case that the number of base stations that are in contact with at least one of the first radio station and the second radio station is increased.

8. The method of claim 6, wherein the variable power adjustment increment is increased in a case that the number of base stations that are in contact with at least one of the first radio station and the second radio station is decreased.

9. A method of controlling power in a radio communication system having a radio interface between a first radio station and a second radio station, comprising:

receiving transmissions of the second radio station at the first radio station;

evaluating, over time, a condition of transmission between the first radio station and the second radio station, detecting a change in the condition of transmission;

determining a transmission power correction instruction that corresponds to a transmission power of the second radio station, the transmission power correction instruction corresponding to a variable power adjustment increment;

changing the variable power adjustment increment in response to a change in the condition of transmission;

transmitting the transmission power correction instruction to the second radio station during a transmission of the first radio station; and adjusting the transmission power of the second radio station according to the transmission power correction instruction;

wherein detecting a change in the condition of transmission comprises detecting an interruption in the transmissions.

10. The method of claim 9, wherein detecting a change in the condition of transmission comprises:

detecting a change in utilization of radio resources between an up-link and a down-link between the first radio station and the second radio station.

11. The method of claim 9, wherein detecting a change in the condition of transmission comprises:

detecting a change to one or more of a number of transmitting antennas and a number of receiving antennas being used during transmission between the first and second radio stations.

12. The method of claim 9, wherein a code division multiple access transmission protocol over a broadband transmission channel is used for transmission between the first radio station and the second radio station.

13. The method of claim 9, wherein the first radio station is a base station and the second radio station is a subscriber station.

14. The method of claim 9, wherein the first radio station is a subscriber station and the second radio station is a base station.

15. The method of claim 9, wherein detecting a change in the condition of transmission comprises:
   changing the variable power adjustment increment in accordance with one of a correspondence table and calculation rule linking different transmission conditions with different variable power adjustment increments.

16. A system for controlling a transmission power of a radio link, comprising:
   a first radio station which receives a first transmission from a second radio station, which detects a change in a condition of transmission from the second radio station, and which determines a transmission power correction instruction in accordance with the change in condition, the transmission power correction instruction corresponding to a variable increment of power adjustment, and the first radio station transmitting the transmission power correction instruction to the second radio station; and
   the second radio station which receives the transmission power correction instruction of the first radio station, which transmits a second transmission to the first radio station, and which adjusts a transmission power during the second transmission in accordance with the transmission power correction instruction;
   wherein the first radio station detects the change in the condition of transmission by detecting an interruption in transmissions.

17. The system of claim 16, wherein the first radio station detects the change in the condition of transmission by detecting a change in utilization of radio resources between an up-link and a down-link between the first radio station and the second radio station.

18. The system of claim 16, wherein the first radio station detects the change in the condition of transmission by detecting a change to one or more of a number of transmitting antennas and a number of receiving antennas being used during transmission between the first and the second radio stations.

19. The system of claim 16, wherein a code division multiple access transmission protocol over a broadband transmission channel is used for transmission between the first radio station and the second radio station.

20. The system of claim 16, wherein the first radio station comprises a base station and the second radio station comprises a subscriber station.

21. The system of claim 16, wherein the first radio station comprises a subscriber station and the second radio station comprises a base station.

22. The system of claim 16, wherein the first radio station changes the variable power adjustment increment in accordance with one of a correspondence table and calculation rule linking different transmission conditions with different variable power adjustment increments.

23. A method of controlling power in a radio communication system having a radio interface between a first radio station and a second radio station comprising:
   receiving transmissions of the second radio station at the first radio station;
   evaluating, over time, a condition of transmission between the first radio station and the second radio station,
   detecting a change in the condition of transmission;
   determining a transmission power correction instruction that corresponds to a transmission power of the second radio station, the transmission power correction instruction corresponding to a variable power adjustment increment;
   changing the variable power adjustment increment in response to a change in the condition of transmission;
   transmitting the transmission power correction instruction to the second radio station during a transmission of the first radio station; and
   adjusting the transmission power of the second radio station according to the transmission power correction instruction;
   wherein detecting a change in the condition of transmission comprises detecting a change to one or more of a number of transmitting antennas and a number of receiving antennas being used during transmission between the first and second radio stations.

24. A system for controlling a transmission power of a radio link, comprising:
   a first radio station which receives a first transmission from a second radio station, which detects a change in a condition of transmission from the second radio station, and which determines a transmission power correction instruction in accordance with the change in condition, the transmission power correction instruction corresponding to a variable increment of power adjustment, and the first radio station transmitting the transmission power correction instruction to the second radio station; and
   the second radio station which receives the transmission power correction instruction of the first radio station, which transmits a second transmission from the second radio station to the first radio station, and which adjusts a transmission power during the second transmission in accordance with the transmitting power correction instruction;
   wherein the first radio station detects the change in the condition of transmission comprises detecting a change to one or more of a number of transmitting antennas and a number of receiving antennas being used during transmission between the first and the second radio stations.

25. A method of controlling power in a radio communication system having a radio interface, comprising:
   receiving a transmission from a second radio station at a first radio station;
   determining a transmission power correction instruction that corresponds to a transmission power of the second radio station, the transmission power correction instruction corresponding to a variable power adjustment increment, the variable power adjustment increment being adjustable in a subscriber-dependent manner and a time-dependent manner; and
   transmitting the transmission power correction instruction to the second radio station during a transmission of the first radio station;
   wherein the variable power adjustment increment is temporarily increased after an end of an interrupt of transmission between the first radio station and the second radio station.

26. A method of controlling power in a radio communication system having a radio interface, comprising:

sending a transmission from a second radio station to a first radio station;

receiving a transmission power correction instruction at the second radio station during a transmission of the first radio station; and adjusting the transmission power of the second radio station according to the transmission power correction instruction;

wherein the transmission power correction instruction corresponds to a transmission power of the second radio station, the transmission power correction instruction corresponds to a variable power adjustment increment, the variable power adjustment increment is adjustable in a subscriber-dependent manner and a time-dependent manner, and the variable power adjustment increment is temporarily increased after an end of an interruption of transmission between the first radio station and the second radio station.

27. A method of controlling power in a radio communication system having a radio interface, comprising:

receiving transmissions of a second radio station at a first radio station;

determining a transmission power correction instruction that corresponds to a transmission power of the second radio station, the transmission power correction instruction corresponding to a variable power adjustment increment;

evaluating, over time, a condition of transmission between the first radio station and the second radio station, the condition of transmission comprising one or more of a number of transmitting antennas and a number of receiving antennas used to establish communication between the first radio station and the second radio station;

transmitting the transmission power correction instruction to the second radio station during a transmission of the first radio station; and adjusting the transmission power of the second radio station according to the transmission power correction instruction;

wherein the variable power adjustment increment varies in accordance with at least one of the number of transmitting antennas and the number of receiving antennas.

28. A method of controlling power in a radio communication system having a radio interface, comprising:

sending transmissions from a second radio station to a first radio station;

evaluating, over time, a condition of transmission between the first radio station and the second radio station, the condition of transmission comprising one or more of a number of transmitting antennas and a number of receiving antennas used to establish communication between the first radio station and the second radio station;

receiving the transmission power correction instruction at the second radio station during a transmission of the first radio station; and adjusting the transmission power of the second radio station according to the transmission power correction instruction;

wherein the transmission power correction instruction corresponds to a transmission power of the second radio station, the transmission power correction instruction corresponds to a variable power adjustment increment, and the variable power adjustment increment varies in accordance with at least one of the number of transmitting antennas and the number of receiving antennas.

* * * * *

UNITED STATES PATENT AND TRADEMARK OFFICE
CERTIFICATE OF CORRECTION

| | | |
|---|---|---|
| PATENT NO. | : 6,885,875 B1 | Page 1 of 1 |
| APPLICATION NO. | : 09/806646 | |
| DATED | : April 26, 2005 | |
| INVENTOR(S) | : Sebastian Obermanns et al. | |

It is certified that error appears in the above-identified patent and that said Letters Patent is hereby corrected as shown below:

Column 10, Claim 24, Line 43:
Delete "transmitting" and Insert --transmission--

Column 10, Claim 24, Line 45:
Delete "detects" and Insert --detecting--

Signed and Sealed this

Fourteenth Day of August, 2007

JON W. DUDAS
*Director of the United States Patent and Trademark Office*